(12) United States Patent
Kirkpatrick et al.

(10) Patent No.: US 7,892,351 B1
(45) Date of Patent: Feb. 22, 2011

(54) COMPOSITION OF MATERIALS AND PROCESSES FOR MAKING BORONCITRATES TO CREATE CEMENTS WITH FIELD ADJUSTABLE SET TIMES

(76) Inventors: William D. Kirkpatrick, 1431 S. Ocean Blvd. #64, Lauderdale by the Sea, FL (US) 33062-7302; Carole W. Kirkpatrick, 1431 S. Ocean Blvd. #64, Lauderdale by the Sea, FL (US) 33062-7302

( * ) Notice: Subject to any disclaimer, the term of this patent is extended or adjusted under 35 U.S.C. 154(b) by 0 days.

(21) Appl. No.: 12/504,192

(22) Filed: Jul. 16, 2009

Related U.S. Application Data

(62) Division of application No. 11/329,864, filed on Jan. 11, 2006.

(60) Provisional application No. 60/643,044, filed on Jan. 11, 2005.

(51) Int. Cl.
*C04B 24/04* (2006.01)
*C04B 22/00* (2006.01)

(52) U.S. Cl. .................. 106/728; 106/819; 106/823

(58) Field of Classification Search ............... 106/728, 106/819, 823
See application file for complete search history.

(56) References Cited

U.S. PATENT DOCUMENTS

| | | | |
|---|---|---|---|
| 3,954,478 A | 5/1976 | Arai et al. | |
| 4,210,619 A | 7/1980 | Haley | |
| 4,640,715 A | 2/1987 | Heitzmann et al. | |
| 4,642,137 A | 2/1987 | Heitzmann et al. | |
| 4,842,649 A | 6/1989 | Heitzmann et al. | |
| 4,997,484 A | 3/1991 | Gravitt et al. | |
| 5,374,308 A * | 12/1994 | Kirkpatrick et al. | 106/709 |
| 5,374,408 A | 12/1994 | Bruzzone et al. | |
| 5,387,283 A * | 2/1995 | Kirkpatrick et al. | 106/709 |
| 5,489,334 A * | 2/1996 | Kirkpatrick et al. | 106/709 |
| 5,490,889 A | 2/1996 | Kirkpatrick et al. | |
| 5,714,003 A * | 2/1998 | Styron | 106/705 |
| 5,997,632 A * | 12/1999 | Styron | 106/705 |
| 6,077,910 A | 6/2000 | Ikuta et al. | |
| 6,114,033 A | 9/2000 | Ikemoto et al. | |
| 6,376,580 B1 | 4/2002 | Ikuta et al. | |
| 6,554,894 B2 * | 4/2003 | Styron et al. | 106/705 |
| 6,932,344 B1 | 8/2005 | Soto | |
| 7,125,944 B2 | 10/2006 | Yamashita et al. | |
| 7,179,453 B1 * | 2/2007 | Montgomery | 424/73 |
| 7,236,290 B1 * | 6/2007 | Zhang et al. | 359/296 |
| 7,503,974 B2 | 3/2009 | Mintz et al. | |
| 2008/0282938 A1 | 11/2008 | Cifuentes et al. | |

FOREIGN PATENT DOCUMENTS

WO    WO 02/26458 A1    4/2002

OTHER PUBLICATIONS

JP 59219377 Asahi Chemical Co. (Feb. 10, 1984) Machine translation into English.*
JP 2005179091 (Jul. 7, 2005) Kushihaashi et al., abstract only.*
JP 2005179091 (Jul. 7, 2005) Kushihashi et al. Machine translation into English.*
JP 02051457 A (Feb. 21, 1990) Sasagawa et al., abstract only.*
JP 02051457 A (Feb. 21, 1990) Sasagawa et al. Machine translation into English.*
Note: All non-patent documents with asterisk were cited in related U.S. Appl. No. 11/329,864 (Kirkpatrick et al.).*

* cited by examiner

*Primary Examiner*—Paul Marcantoni
(74) *Attorney, Agent, or Firm*—McKee, Voorhees & Sease, P.L.C.

(57) ABSTRACT

A family of compounds has been developed containing a substantial quantity of boron in solution with other beneficial ingredients that has been heretofore unobtainable. These compounds are named and referred to herein as "Boroncitrates". The individual Boroncitrates are: boron lithium citrate (BLiCit), boron potassium citrate (BKCit) and boron sodium citrate (BNaCit). These Boroncitrates can be used individually or in combination with one another. Alkali metals such as rubidium, cesium and francium could also be made into Boroncitrates; but, there is no advantage in using these very scarce and much more expensive alkali metals.

Use of Boroncitrates provides a new and improved means for hydraulic cementitious compositions to take set faster or slower, as determined by the user and as the individual jobsite needs dictate; thereby providing the long-sought, unfulfilled flexibility required by today's rapidly expanding concrete industry. As discussed herein, the application and use of Boroncitrates can provide beneficial improvement in many hydraulic cement varieties, such as, but not limited to, Portland Cement, class C fly ash and blended hydraulic cements containing combinations of the above.

32 Claims, No Drawings

COMPOSITION OF MATERIALS AND PROCESSES FOR MAKING BORONCITRATES TO CREATE CEMENTS WITH FIELD ADJUSTABLE SET TIMES

CROSS REFERENCE TO RELATED APPLICATIONS

This is a Divisional Application of U.S. Ser. No. 11/329,864 filed Jan. 11, 2006, which claims the benefit of provisional patent application Ser. No. 60/643,044, filed Jan. 11, 2005 and incorporated herein by reference.

FEDERALLY SPONSORED RESEARCH

Not Applicable

SEQUENCE LISTING OR PROGRAM

Not Applicable

BACKGROUND OF THE INVENTION

1. Field of Invention

This invention relates to the use of chemical compositions to improve the performance of hydraulic cements, specifically the use of Boroncitrates to establish and control the time of set, of hydraulic cements.

2. Prior Art

All hydraulic cement concrete, mortar and grouting placements do not take the same time to place and finish. Continuing the same method employed in making hydraulic cements in the early 1800's and regardless of changing needs, ninety percent of all hydraulic cements are manufactured with extended predetermined set times. Larger, more complex concrete structures require additional time to complete. Inversely, the need for faster setting, faster strength-gaining hydraulic cements for easy applications, or rapid retrofit construction, are now common necessities in all urban areas, and an absolute necessity for our military.

Unnecessary construction delays cost millions of dollars annually. In fact, the most costly waste during construction of structures requiring cementitious compositions is waiting for the concrete, mortar and grouts to take set—so they can begin to develop useable strengths.

Jobsite circumstances and the needs of those responsible for placing the materials would be better served if the set time could be slowed down or speeded up just before placement, as well as during placement. Without the ability to alter the time of set, to coincide with requirement for particular applications, cementitious compositions are provided which either stay plastic for hours or take set in minutes. This lack of flexibility insures job delays as every trade waits unnecessarily for slow setting concrete, mortar or grout to take set and start gaining strength, or relegates fast setting cements to small applications using small, less cost effective, mixing equipment.

As a result, owners, developers and contractors are becoming increasingly less satisfied with generic cements that take set slow and gain moderate strengths after days of waiting. In response to their customers dissatisfaction with the predetermined set times of their cement the portland cement manufactures have just recently reduced the set time of their cement from approximately six (6) hours to approximately five (5) hours. This modification acknowledges the problem but does not address the need for providing cements whose set time can be made either faster or slower as individual jobsite conditions dictate.

BACKGROUND OF INVENTION

Objects and Advantages

The time before set determines how fast or slow cementitious compositions must be placed. Therefore, the amount of time should depend on the application and particular needs of the customer, rather than an arbitrary predetermined time of set that is built into cements as they are being manufactured. There are numerous reasons for placing concrete either slower or faster depending on the particular application and jobsite circumstances at time of placement. Examples are many. A few should suffice:

More time is required to place concrete in structures that are becoming more complex and require tight steel cages than simple applications requiring no steel at all.

Low slump concrete takes time to place; whereas, self leveling concrete is poured.

Finishing takes time, or none may be needed.

Unskilled laborers require additional time; whereas, skilled workers are forced to wait instead of proceeding with another phase.

Workers get hurt, or may not show up.

The pressing need for the structure may dictate faster placement and faster strength gain so it can be put into service quickly. The next use for the same material may require pumping it a great distance before it is placed.

It is well known that adding more water extends the time of set, but reduces the strengths and durability of cementitious compositions. Unfortunately, when more time before set is essential, this last minute means of extending set is often used; because, a better alternative is not available.

Many mining and tunneling applications require mixing the cement, aggregates and water above ground, pumping them great distances, then placing various amounts of the material on a need-to-basis. In most instances the customer would then prefer for the material to take set and gain strength quickly. However, substantially retarded cements do just the opposite.

Cement, aggregates and water that is mixed and pumped great distances must be fluid. However, if the application requires the mix to be shot or otherwise placed on a vertical surface it would be preferable if its fluid state could then be changed, at the point of application, to one that is thixotropic.

The rate of strength gain for cementitious materials is in direct proportion to the speed of the set. Faster setting cements are followed by a faster rate of strength gain permitting earlier use. Inversely, slow setting cements are followed by slower rates of strength gain and delayed use of the structures. In addition, substantially retarded cements do not obtain the ultimate strength gain of cements allowed to set fast.

Trucks used to mix, transport and convey large volumes of mixing concrete are much more expensive than the materials they haul. Ready mix plants out of which these trucks work are becoming further removed from construction sites. Traffic congestion is now commonplace. Therefore, rapid setting, rapid strength gaining concrete, mortars and grouts, that may prematurely take set before being discharged, are rarely handled in high volume transport equipment. This fact alone severely limits the use of fast setting rapid strength gaining cements.

This problem is so acute an entire industry of new concrete mixing and transporting equipment has emerged. Volumetric mixers transport all the materials in a dry form and then combine them with water in a mixing screw that extends out the back of the truck. One of the restrictions in using this type of equipment is the extremely short time the material is mixed. Unlike the rotating drum mixers on ready mix trucks, which continually mix from the time they leave the plant to the job site, ten (10) to fifteen (15) seconds is as long as the material is mixed in the mixing screw of a volumetric mixer. Ten (10) to fifteen (15) seconds is not enough time for a quantity of granular boron compounds to go into solution and become evenly dispersed.

If appropriate boron compounds can be used in enough quantity, they can be an effective retarder for many types of hydraulic cements. In addition, and again when used in enough quantity, boron compounds could provide two additional and valuable benefits for the concrete that would last throughout the entire life of the structure: (1) The use of compounds containing boron is an extremely effective means for preventing the corrosion of steel used in concrete; and, (2) Boron acts as a shield against nuclear radiation. Unfortunately, the use of compounds containing boron for corrosion prevention and nuclear shielding in concrete is severely limited, at present, by the amount of boron that will stay in solution even pt moderately low temperatures, and the fact that if used in very large amounts, boron compounds would prevent the set for much longer than would be desired.

Only a limited quantity of compounds containing boron will remain in solution at even moderately low temperatures. Unfortunately, preheating concrete and mortars in their plastic state, just to be able to add more compounds containing boron is impractical.

SUMMARY

This new invention provides the means to make and use a new composition of material which we call Boroncitrate. It can be used in a liquid or dry form to both retard and accelerate the set of cementitious compositions. After being made in a liquid form, and then dried, this new composition of material will rapidly go back into solution when water is added; thereby, sharply reducing the necessary mixing time.

Over the course of several years we have conducted series of tests on the effectiveness and performance of Boroncitrates with the United States military. These include tests that were conducted on three (3) different occasions by the United States Army and on two (2) different occasions by the United States Air

PREFERRED EMBODIMENTS

Boric Acid ($H_3BO_3$) helps suspend hydration of cementitious materials. The Use of only Boric Acid causes the cementitious material to become thixatropic once the energy ceases. Boric Acid is obtainable from the United States Borax Corporation.

Borax 5 Mole ($Na_2B_4O_7 \cdot 5H_2O$) or Borax 10 Mole ($Na_2B_4O_7 \cdot 10H_2O$) also helps suspend the set of cementitious composition and can be obtained from the United States Borax Corporation. However, as opposed to using Boric Acid, the use of only Borax causes the cementitious material to remain fluid.

Polyborate ($Na_2B_8O_{13} \cdot 4H_2O$) is a manufacturer's combined combination of boric acid and borax, and can be obtained from United States Borax Corporation.

Subbituminous Class C fly ash can be made into high-performance cement once the proper amount of the various enhancing chemicals is ascertained. Use of Subbituminous Class C fly ash from numerous locations throughout the United States is demonstrated in Examples 1 through 22 of this patent application, and can be obtained from Boral Industries and other fly ash marketers.

Test examples have shown how Portland Cement Types I, II, III and V can be used successfully with Boroncitrates. Any Portland Cement manufacturer, such as the LaFarge Corporation or Cemex Corporation can furnish the types of Portland Cement needed.

Lithium Hydroxide (LiOH) or Lithium Carbonate (Li2CO3) when used in the proper amounts in Boroncitrates will prevent alkali silica reactivity from occurring in even large quantities of Class C Subbituminous fly ash according to tests conducted by the United. States Army Corp of Engineers.

Lithium Citrate ($C_6H5Li_3O_7$) is a manufacturer's combined combination of Lithium Hydroxide and Citric Acid or Lithium Carbonate and Citric Acid, and can be obtained from FMC Corporation.

Lithium Hydroxide, Lithium Carbonate and Lithium Citrates can be obtained from FMC Corporation.

Potassium Hydroxide (KOH) and Potassium Carbonate (K2CO3) can be obtained from Occidental Chemical Corporation and others.

Sodium Hydroxide (NaOH) and Sodium Carbonate (Na2CO3) can be obtained from Occidental Chemical Corporation and others.

Citric Acid ($HOOCCH_2C(COH)(COOH)CH_2COOH$), Sodium Citrate and Potassium Citrate can be obtained from Archer Daniels Midland Corporation.

Potassium Citrate ($C_6H_5K_3O_7 \cdot H_2O$) is a manufacturer's combined combination of Potassium Hydroxide and Citric Acid or Potassium Carbonate and Citric Acid, and can be obtained from Archer Daniels Midland Corporation.

Sodium Citrate ($C_6H_8O_7Na_3 2H_2O$) is a manufacturer's combined combination of Sodium Hydroxide and Citric Acid or Sodium Carbonate and Citric acid, and can be obtained from Archer Daniels Midland Corporation.

Examples will show how Boroncitrates provide the means to:

Build concrete structures faster, eliminating unnecessary delays, and thereby reduce the overall cost of construction.

Reduce the risk of premature set in expensive high volume mixing and transporting equipment.

Increase and/or decrease the time of set, alternately if the job conditions so dictate.

Improve the durability of the concrete.

The need to have variable set time cements also created this new composition of material with several unexpected benefits. Some of these new benefits may prove to be even more valuable than the original intent for the composition of material.

When mixed with the full amount of water needed to make concrete, Boroncitrate will prevent the water from freezing even when the temperature is as low as 20° F.; and, even at this low temperature the cementitious composition will take set and gain high useable strengths. Conversely, for fear of the material not taking set and developing high enough strength, many state Departments of Transportation ("DOT") mandate that portland cement concrete may not be placed on DOT jobs when the temperature is 40° F. and falling. It would be difficult to ascertain the total costs and user delays that could be eliminated if this restriction could be lifted.

It has been learned that surprisingly Boroncitrate can be used with cementitious compositions in a much larger quantity than would be necessary for them to just retard the set and enhance the strength. The composition still takes set in the time established by the ratio of chemicals used. This enables a significantly larger amount of the compounds within Boroncitrates to be present in the hardened mass. Increasing the amount of boron increases corrosion prevention and nuclear shield value. Increasing the available citrates enhances the ability of the material to form hardened structures that are virtually waterproof. Using the combined benefits of: (1) controlled set and (2) increased quantity of chemicals; one can achieve effective and rapid encapsulation with hydraulic cements for nuclear radiation containment.

Another surprising benefit of this new Boroncitrate material is its ability to be used to quickly determine what quantity of cement enhancing chemicals should be used with a cementitious material to provide the most cost effective results. This feature is particularly useful when attempting to utilize cementitious waste materials that are not manufactured as cements such as Class C fly ash. Examples will show, once the proper amount of the various enhancing chemicals is ascertained: Class C fly ash can be made into high-performance hydraulic cement. When using Boroncitrate this can be established quickly and efficiently.

There is a tremendous need to use lithium compounds to prevent the alkali-silica-reaction ("ASR") when alkali reactive aggregates are used with hydraulic cements to make concrete. When the alkali in cement reacts with reactive aggregates a gel is formed, the aggregates expand and the concrete self-destructs. This normally occurs years after the structure is in service. The entire western United States has limited amounts of aggregates that are not alkali reactive. Many of the other states as well as areas throughout the world have the same problem. The shortage of non-reactive aggregates has already reached the acute stage in California and New Mexico. Unfortunately, only a limited amount of lithium hydroxide and lithium carbonate will go into solution and not fall out at lower temperatures. Surprisingly, however, Boroncitrate compounds can be made that contain enough lithium that will stay in solution to prevent alkali-silica reaction even when reactive aggregates are used.

The ASR problem is so acute that the DOT in some states has recently banned the use of Class C fly ash with its high alkali content altogether. This edit results in millions of tons of this ash to be buried in land fills. It can not help but effect the decisions of power generating-companies as to which coal they should burn. Since Class C fly ash has the lowest emissions of all the coals, this ban on usage of its waste has a multiplying effect. Recent Tests conducted by the US Army Corp of Engineers, used the proper amount of chemicals contained in (BLiCit), together with a very large quantity of Class C fly ash. The results were excellent. Highly reactive aggregates can be used with large quantities of Class C fly ash with superior results if the proper amount of (BLiCit) is included.

Boroncitrate having a higher ratio of boron compounds to the citrate compound can be used to reduce the water/cement ratio while retarding the set so that cementations compositions can be safely transported in a plastic state for great distances. When the material is ready for discharge, the time of set can then be accelerated by adding additional Boroncitrate having a higher percent of citrate; thereby accelerating the time of set at time of discharge. This feature is needed because boron compounds retard the set but do not reduce the water/cement ratio, while citrates accelerate the set and reduce the water/cement ratio. Therefore, having some citrate in the retarded mix to be transported makes it possible to mix the material in route to the jobsite without having to utilize an excessive amount of water in the mix. Then, following activation at the jobsite with more Boroncitrates containing a higher percent of citrates the set of cement is accelerated without causing the mixture to be too fluid.

The ability to increase the use of boron compounds and citrates while maintaining the set time enables the user to provide stronger, more durable structures; because, there would be more effective nuclear shielding, higher corrosion protection, less permeability, and when needed, ample alkali-silica reaction protection. This would apply not only to manufactured cements but cementitious fly ash as well.

PROCESS FOR MAKING BORONCITRATES

First—The amount of water that will dissolve the various chemical components to be added is poured into a vessel where the contents can be heated and agitated. In most instances 50% water to 50% chemicals is sufficient; however, more water can be used because the amount of water is far below the amount needed to mix the concrete. A higher ratio of water to chemicals will permit a larger percent of borons to be added.

Borax and boric acid are relatively insoluble in even mildly cool water. In the past, this fact alone has, limited their use as retarders for hydraulic cements which are traditionally used with unheated tap water that in many instances is quite cool. Therefore, the water needs to be heated before these boron compounds are added. The most cost-effective way to accomplish this is to:

Second—Slowly add the amount of one or more alkali metal compounds such as: lithium, sodium and/or potassium hydroxide and/or lithium, potassium and/or sodium carbonate that will be required for the entire quantity of Boroncitrate to be made as the water is being agitated.

Third—Slowly add the amount of citric acid that will be required for the entire quantity of Boroncitrate to be made as the water is being agitated.

Note: The proportion of citric acid to alkali metal compound should be such that when completed the PH of the composition is neutralized but only to the point of not being dangerous to handle, (keeping in mind the borax is a mild alkali and therefore will help dilute the strength of alkali metal compound, and the boric acid is a mild acid and therefore will help neutralize the alkali that is present). The Ph would need to be adjusted accordingly to allow for safe handling. To bring the Ph within an acceptable range between 6 and 10, the person making the Boroncitrate would have to adjust the Ph with an acid (most likely citric acid), or, if too low with an alkali metal. In both instances the amount of citric acid that would normally be used to neutralize the alkali is reduced. Reduction in the amount of citric acid used is desirable; because, it not only reduces the cost but the more expensive citric acid acts as an accelerator of the set; and, the desire is to retard the set at the least possible cost.

Fourth—A higher volume of borax and/or boric acid will go into solution if the water is heated. It is easier, and the material goes into solution faster, if the water is simply brought to a boil. It is most important before the borons are added to the solution of alkalis and citric acid that the water is at least 180° and preferably 200° or above.

Note: Very little additional heat is needed because the exothermic reaction of combining the alkalis and acids will heat the water to boiling if they are combined faster. The resulting Boroncitrate should be maintained at a temperature above 180° F. for a few minutes to make certain the boron compounds, alkali metal compounds and citric acid are well fixed in solution. When cooled, even to 20° F., the chemicals remain in solution. Once cooled, additional water should replace the water that has evaporated.

Boroncitrate can be made to amplify the effectiveness of the individual chemical properties. Various amounts of potassium and/or sodium and/or lithium carbonates and/or hydroxides can be combined with borax and/or boric acid and citric acid. Examples will show that the intensity of the various chemicals determines their performance in the different cementitious compositions.

EXAMPLE 1

Boroncitrates-Vs-Dry Powders

The following three tests were conducted to demonstrate the difference between using the identical chemical components in a dry powder and Boroncitrate form.

The synergism created by combining the chemicals into Boroncitrates helps in three important ways; (1) The ability to control the set time (i.e., longer or shorter set times) (2) Higher strengths and (3) Lower cost. This is shown in the examples below wherein the chemicals used are the same, but much different results occur.

| Chemicals | TEST #1 Liquid Boron-citrates | TEST #2 Dry Powders | TEST #3 Dry Powders |
|---|---|---|---|
| Boric Acid | 3.72 | 3.72 | 3.72 |
| Borax | 8.68 | 8.68 | 8.68 |
| Lithium Hydroxide | 20.67 | 20.67 | 20.67 |
| Citric Acid | 38.93 | 38.93 | 38.93 |
| 50% Chemicals | 72.00 | 72.00 | 72.00 |
| 50% Water | 72.00 | | |
| Boroncitrate: | 144.00 | | |
| Additional mixing water added: | 155.70 | | |
| Total water used: | 227.70 | 227.70 | 227.70 |
| Initial Sets: | 2 hr 42 min | 5 min | 8 min |
| Final Sets: | 2 hr 50 min | 6 min | 9 min |
| Compressive strength(psi): | 1 day 6500 | 1 day 6125 | 1 day 6625 |
| | 7 day 11250 | 7 day 9800 | 7 day 10000 |
| | 14 day 13800 | 14 day 11250 | 14 day 11250 |
| Mix Design: | 900 g | Oklaunion, TX Subbituminous Class C Fly Ash | Mixed 3 mins. |
| | 90 g | Type 1 portland cement | 0.23 water/cement ratio |
| | 1485 g | 30/70/Fine Sand | 40/60% cement to sand mortar |

After conducting Test 1 followed by Test 2 we noted the difference in the set times of these two seemingly identical tests. We thought that the reason was perhaps the borons, (Boric Acid and Borax) had not gone into solution before the Lithium Hydroxide and Citric Acid began to activate and accelerate the set. Therefore, Test 3 was conducted to be the same in every respect to Test 2 except the Boric Acid and Borax were premixed in the total quantity of mixing water to be used before the balance of the components were added. Test 3 compared to Test 2 did show that some of the boron retarders did not get into solution in Test 2. However, Test 2 and Test 3 when compared to Test 1 show the great effectiveness of the Boroncitrates to retard the compositions with the same quantity of chemicals. Stated another way, it is very evident that to achieve the same degree of retardation of Test 1 the amount of Boric Acid and Borax in Test 2 and Test 3 would have to be increased.

As all the examples show, increasing the Boron retarders reduces the early strengths. Therefore, not only is the cost increased but the performance is decreased.

EXAMPLE 2

Potassium Carbonate/Boric Acid/Citric Acid Boroncitrate [SET] Control

| Chemicals | % Long Set | 100% Long Set | 45% Long Set | 45% Long 55% Short Set (Combined) | 55% Short Set | 100% Short Set | % Short Set |
|---|---|---|---|---|---|---|---|
| Boric Acid | 0.2637 | 11.67 | 5.25 | 6.90 | 1.65 | 3.00 | 0.0678 |
| Potassium Carbonate | 0.3833 | 16.96 | 7.63 | 19.46 | 11.83 | 21.50 | 0.4859 |
| Citric Acid | 0.3530 | 15.62 | 7.03 | 17.89 | 10.86 | 19.75 | 0.4463 |
| 30% Chemicals: | | 44.25 | 19.91 | 44.25 | 24.25 | 44.25 | |
| 70% Water: | | 103.25 | 46.46 | 103.25 | 56.79 | 103.25 | |
| Boroncitrates: | | 147.50 | 66.37 | 147.50 | 81.04 | 147.50 | |

-continued

Potassium Carbonate/Boric Acid/Citric Acid Boroncitrate [SET] Control

| Chemicals | % Long Set | 100% Long Set | 45% Long Set | Combined 45% Long 55% Short Set | 55% Short Set | 100% Short Set | % Short Set |
|---|---|---|---|---|---|---|---|
| Additional mixing water added: | | 124.45 | | 124.45 | | 124.45 | |
| Total water used: | | 227.70 | | 227.70 | | 227.70 | |
| Final Sets: | | 10 hr 45 min | | 2 hr 45 min | | 10 min | |
| Compressive strength (psi) | | 1 day 4800 | | 1 day 5250 | | 1 day 5250 | |
| | | 7 day 6450 | | 7 day 8200 | | 7 day 9000 | |
| | | 14 day 8250 | | 14 day 9800 | | 14 day 10250 | |
| Mix Design: | 900 g | Pueblo, CO Subbituminous Class C fly ash | | | Mixed 3 min. | | |
| | 90 g | Type 1 portland cement | | | 0.23 water/cement ratio | | |
| | 1485 g | 30/70/Fine sand | | | 40/60% cement to sand mortar | | |

EXAMPLE 3

Potassium Carbonate/Borax/Citric Acid Boroncitrate [SET] Control

| Chemicals | % Long Set | 100% Long Set | 0.233 Long Set | Combined 23.3 long 76.7 short Set | 0.767 Short Set | 100% Short Set | % Short Set |
|---|---|---|---|---|---|---|---|
| Borax | 0.2674 | 18.25 | 4.25 | 9.13 | 4.87 | 6.35 | 0.0930 |
| Potassium Carbonate | 0.3663 | 25.00 | 5.83 | 29.56 | 23.74 | 30.95 | 0.4535 |
| Citric Acid | 0.3663 | 25.00 | 5.83 | 29.56 | 23.74 | 30.95 | 0.4535 |
| 35% Chemicals | | 68.25 | 15.90 | 68.25 | 52.35 | 68.25 | |
| 65% Water | | 126.75 | 29.53 | 126.75 | 97.22 | 126.75 | |
| Boroncitrates: | | 195.00 | 45.43 | 195.00 | 149.57 | 195.00 | |
| Additional mixing water added: | | 100.95 | | 100.95 | | 100.95 | |
| Total water used: | | 227.70 | | 227.70 | | 227.70 | |
| Final Sets: | | 4 hr 49 min | | 1 hr 53 min | | 12 min | |
| Compressive strength (psi) | | 17 hr 45 min 2850 | | 20 hr 4500 | | 3 hr 30 min 2750 | |
| | | 7 da 6750 | | 7 da 7625 | | 7 da 7800 | |
| | | 14 da 7625 | | 14 da 8125 | | 14 da 8275 | |
| Mix Design: | | | | | | | |
| 50% | 612 g | Oologah, OK Subbituminous Class C fly ash | | | mixed 3 min. | | |
| 50% | 612 g | Type 1 portland cement | | | 0.23 water/cement ratio | | |
| | 1836 g | 30/70/Fi 30/70/Fine sand | | | 40/60% cement to sand mortar | | |

In these tests we used 50% fly ash and 50% Type 1 Portland Cement which would increase the cost and lower the very early strengths, but does not appear to effect the later strengths.

EXAMPLE 4

Potassium Carbonate/Boric Acid/Borax/Citric Acid
Boroncitrate [SET] Control

| Chemicals | % Long Set | 100% Long Set | Combined 25.6% Long Set | 25.6% (L) 74.4% (S) Set | 74.4% Short Set | 100% Short Set | % Short Set |
|---|---|---|---|---|---|---|---|
| Boric Acid | 0.0876 | 4.38 | 1.12 | 1.79 | 0.6696 | 0.90 | 0.0180 |
| Borax | 0.2064 | 10.32 | 2.64 | 4.21 | 1.5698 | 2.11 | 0.0422 |
| Potassium Hydroxide | 0.3664 | 18.32 | 4.69 | 22.05 | 17.358 | 23.33 | 0.4666 |
| Citric Acid | 0.3396 | 16.98 | 4.35 | 21.95 | 17.60 | 23.66 | 0.4732 |
| 50% Chemicals: | | 50.00 | 12.80 | 50.00 | 37.20 | 50.00 | |
| 50% Water: | | 50.00 | 12.80 | 50.00 | 37.20 | 50.00 | |
| Boroncitrates: | | 100.00 | 25.60 | 100.00 | 74.40 | 100.00 | |
| Additional mixing water added: | | 177.70 | | 177.70 | | 177.70 | |
| Total water used: | | 227.70 | | 227.70 | | 227.70 | |
| Final Sets: | | 9 hr 46 min | | 1 hr 20 min | | 30 min | |
| Compressive strength (psi) | 1 day | 3700 | 1 day | 5000 | 1 day | 5250 | |
| | 7 day | 5200 | 7 day | 6850 | 7 day | 7950 | |
| | 14 day | 6000 | 14 day | 8300 | 14 day | 9500 | |
| Mix Design: | 900 g | Pueblo, CO Subbituminous Class C fly ash | | mixed 3 min. | | | |
| | 90 g | Type 2 portland cement | | 0.23 water/cement ratio | | | |
| | 1485 g | 30/70/Fine sand | | 40/60% cement to sand mortar | | | |

EXAMPLE 5

Potassium Hydroxide/BoricAcid/Citric Acid
BORONCITRATE [SET] Control

| Chemicals | % Long Set | 100% Long Set | Combined 47% Long Set | 47% Long 53% Short Set | 53% Short Set | 100% Short Set | % Short Set |
|---|---|---|---|---|---|---|---|
| Boric Acid | 0.2146 | 14.38 | 6.76 | 10.75 | 4.00 | 7.54 | 0.1125 |
| Potassium Hydroxide/ | 0.3839 | 25.72 | 12.09 | 28.13 | 16.04 | 30.26 | 0.4516 |
| Citric Acid | 0.4015 | 26.90 | 12.64 | 28.12 | 15.48 | 29.20 | 0.4358 |
| 50% Chemicals: | | 67.00 | 31.49 | 67.00 | 35.51 | 67.00 | |
| 50% Water: | | 67.00 | 31.49 | 67.00 | 35.51 | 67.00 | |
| Boroncitrates: | | 134.00 | 62.98 | 134.00 | 71.02 | 134.00 | |
| Additional mixing water added: | | 131.00 | | 131.00 | | 131.00 | |
| Total water used: | | 198.00 | | 198.00 | | 198.00 | |
| Final Sets: | | 5 hr 47 min | | 2 hr 3 min | | 11 min | |
| Compressive Strengths (psi): | | 1 da 4750 | | 1 da 5800 | | 1 da 5125 | |
| "da" represents days | | 7 da 6750 | | 7 da 6875 | | 7 da 9125 | |
| | | 14 da 7450 | | 14 da 8875 | | 14 da 10000 | |
| | | | | | | *28 da 11125 | |
| Mix Design: | 900 g | Lansing, MI Subbituminous Class C fly ash | | Mixed 15 sec. | | | |
| | 90 g | Type 1 portland cement | | 0.20 water/cement ratio | | | |
| | 1485 g | 30/70/fine sand | | 40/60% cement to sand mortar | | | |

*Boroncitrates work so effectively with the cementitious materials, developing strengths so quick and so high, this is the only example we will show with 28 day ultimate strengths.

Each of the above three (3) tests were mixed fifteen (15) seconds to similate the very fast mixing time provided when mixed in a Volumetric or Mobile mixer.

EXAMPLE 6

| | | | | Potassium Hydroxide/Borax/Citric Acid BORONCITRATE [SET] Control | | | |
|---|---|---|---|---|---|---|---|
| | | | | Combined | | | |
| Chemicals | % Long Set | 100% Long Set | 25% Long Set | 25% Long 75% Short Set | 75% Short Set | 100% Short Set | % Short Set |
| Borax | 0.3571 | 25.00 | 6.25 | 10.00 | 3.75 | 5.00 | 0.0714 |
| Potassium Hydroxide | 0.2571 | 18.00 | 4.50 | 29.39 | 24.89 | 33.19 | 0.4741 |
| Citric Acid | 0.3857 | 27.00 | 6.75 | 30.61 | 23.86 | 31.81 | 0.4544 |
| 30% Chemicals | | 70.00 | 17.50 | 70.00 | 52.50 | 70.00 | |
| 70% Water | | 163.33 | 40.83 | 163.33 | 122.50 | 163.33 | |
| Boroncitrates: | | 233.33 | 58.33 | 233.33 | 175.00 | 233.33 | |
| Additional mixing water added: | | 64.37 | | 64.37 | | 64.37 | |
| Total water used: | | 227.70 | | 227.70 | | 227.70 | |
| Final Sets: | | 12 hrs | | 1 hr 40 min | | 30 min | |
| Compressive | 2 day | 2000 | 1 day | 5050 | 1 day | 4750 | |
| Strengths (psi) | 7 day | 3625 | 7 day | 7050 | 7 day | 5875 | |
| | 14 day | 4800 | 14 day | 7450 | 14 day | 9000 | |
| Mix Design | | 900 g Gibbons Creek, TX Subbituminous Class C Fly Ash | | | | | |
| | | 90 g Type 1 portland cement    0.23 water/cement ratio | | | | | |
| | | 1485 g 30/70/Fine sand    40/60% cement to sand mortar | | | | | |

To simulate the mixing time of a Volumetric (Mobile) Mixer these mixes were only mixed fifteen seconds each.

It is widely known that the use of too much water in the industry is a common error. The use of too much water in cemetitious mixes results in a dramatic loss in strength. In this example too much water was used to demonstrate that while the strengths are somewhat lower, the general negative effect of too much water has been diminished considerably.

EXAMPLE 7

| | | | | Potassium Hydroxide/Boric Acid/Borax/Citric Acid Boroncitrate [SET] Control | | | |
|---|---|---|---|---|---|---|---|
| | | | | Combined | | | |
| Chemicals | % Long Set | 100% Long Set | 50% Long Set | 50% Long 50% Short Set | 50% Short Set | 100% Short Set | % Short Set |
| Boric Acid | 0.1019 | 6.48 | 3.24 | 3.89 | 0.65 | 1.30 | 0.0204 |
| Borax | 0.2378 | 15.12 | 7.56 | 9.07 | 1.51 | 3.02 | 0.0475 |
| Potassium Hydroxide | 0.2831 | 18.00 | 9.00 | 22.67 | 13.67 | 27.34 | 0.4300 |
| Citric Acid | 0.3772 | 23.98 | 11.99 | 27.95 | 15.96 | 31.92 | 0.5020 |
| 50% Chemicals: | | 63.58 | 31.79 | 63.58 | 31.79 | 63.58 | |
| 50% Water: | | 63.58 | 31.79 | 63.58 | 31.79 | 63.58 | |
| Boroncitrates: | | 127.16 | 63.58 | 127.16 | 63.58 | 127.16 | |
| Additional mixing water added: | | 164.12 | | 164.12 | | 164.12 | |
| Total water used: | | 227.70 | | 227.70 | | 227.70 | |
| Final Sets: | | 6 hr 30 min | | 47 min | | 6 min | |

-continued

Potassium Hydroxide/Boric Acid/Borax/Citric Acid Boroncitrate [SET] Control

| Chemicals | % Long Set | 100% Long Set | Combined 50% Long Set | 50% Long 50% Short Set | 50% Short Set | 100% Short Set | % Short Set |
|---|---|---|---|---|---|---|---|
| Compressive strength (psi) | 3 day | 6250 | 3 day | 8250 | 3 day | 9000 | |
| | 7 day | 8400 | 7 day | 8800 | 7 day | 9750 | |
| | 14 day | 9000 | 14 day | 10750 | 14 day | 11750 | |
| Mix Design: | 900 g Pueblo, CO Subbituminous Class C fly ash    mixed 3 min. | | | | | | |
| | 90 g Type 2 portland cement    0.23 water/cement ratio | | | | | | |
| | 1485 g 30/70/Fine sand    40/60% cement to sand mortar | | | | | | |

The following example shows boroncitrates made from manufacture's combined chemicals, (e.g., potassium citrate and polyborate). For example polyborates are a manufacturer's combination of boric acid and borax and potassium citrate is a combination of potassium carbonate OR potassium hydroxide AND citric acid. In prior examples we did not use manufactured citrates to create boroncitrates, but instead used the individual components. In this example we have shown that the use of manufactured citrates to create boroncitrates can provide similar results. However, the boric acid and borax would still have to be put into solution as described in this invention.

Potassium Citrate/Polyborate Boroncitrate [SET] Control

| Chemicals | Percent | 100% Long Set | Percent | 100% Short Set |
|---|---|---|---|---|
| Poloyborate*: | 0.2038 | 12.96 | 0.0679 | 4.32 |
| Potassium | 0.7962 | 50.62 | 0.9321 | 59.26 |
| Citrate**: | | | | |
| 45% Chemicals | | 63.58 | | 63.58 |
| 55% Water: | | 77.71 | | 77.71 |
| Boroncitrates: | | 141.29 | | 141.29 |
| Additional mixing water added: | | 149.99 | | 149.99 |
| Total water used: | | 227.70 | | 227.70 |
| Final Sets: | | 1 hr 6 min | | 6 min |
| Compressive strength (psi) | 1 day | 6750 | 1 day | 9750 |
| | | Ph 11 | | Ph 12 |
| Mix Design: | 900 g Pueblo, CO Subbituminous Class C Fly Ash | Mixed 3 minutes | | |
| | 90 g Type 1 portland cement | 0.23 water/cement ratio | | |
| | 1485 30/70/Fine Sand | 40/60 Cement to Sand Ratio | | |

| | |
|---|---|
| *Amount of Boric Acid in Polyborate | [0.2987] |
| *Amount of Borax in Polyborate | [0.7013] |
| **Amount of Potassium Carbonate in Citrate if Ph7 | [0.5190] |
| **Amount of Citric Acid in Citrate if Ph7 | [0.4810] |
| or | or |
| **Amount of Potassium Hydroxide in Citrate if Ph7 | [0.4667] |
| **Amount of Citric Acid in Citrate if Ph7 | [0.5333] |

The amounts shown in brackets [ ] are shown are actual percentages of the boric acid or borax used in polyborates and the percentages of sodium hydroxide, sodium carbonate and citric acid used in sodium citrates with a PH of 7. However, the PH of the sodium citrate used in this example was PH10.

Manufactured citrates cause a problem because the manufacturer do not divulge whether they are using carbonates or hydroxides with citric acid to make the citrates. As you can see by the examples, the percentage of both the carbonates and the citric acid are shown as well as the percentage of the hydroxide and citric acid for clarification.

This shows that the manufacturer of the citrate used/elected to make the particular citrate with a slightly greater alkali content. This presents a problem because it is the citric acid that accelerates the set time and the borons that retard the set. If the manufactured citrate that is used contains more citric acid, it would necessitate using more borons to get the same set time. The resulting PH of the boroncitrates were PH11 and PH12 respectively.

While the above shows boroncitrates can be made in this way, the person making the combination of chemicals must still check the Ph of the combined chemicals. In this instance the Polyborate with a Ph of 8 combined with a Potassium Citrate with a Ph of 10 resulted in the Long set having a Ph of 11 and the short set a Ph of 12. The Ph would need to be adjusted accordingly to allow for safe handling. To bring the Ph within an acceptable range between 6 and 10, the person making the boroncitrate would have to adjust the Ph with an acid, (most likely citric acid). This of course defeats the purpose of using a manufacture's prepared citrate. It is most important to note that the Ph has nothing to do with causing the set to be fast or slow. The time of set is regulated by the percentage of the various chemicals used.

Anyone skilled in the art will recognize immediately that the borons (whether boric acid or borax) retard the set. They will also recognize that the alkali metal and citric acid combine to accelerate the set.

EXAMPLE 9

Lithium Carbonate/Boric Acid/Citric Acid
BORONCITRATE [SET] Control

| Chemicals | % Long Set | 100% Long Set | 50% Long Set | Combined 50% Long 50% Short Set | 50% Short Set | 100% Short Set | % Short Set |
|---|---|---|---|---|---|---|---|
| Boric Acid | 0.3043 | 22.82 | 11.41 | 15.61 | 4.20 | 8.39 | 0.1119 |
| Lithium Carbonate | 0.2541 | 19.06 | 9.53 | 21.71 | 12.18 | 24.36 | 0.3248 |
| Citric Acid | 0.4416 | 33.12 | 16.56 | 37.69 | 21.13 | 42.25 | 0.5633 |
| 33.33% Chemicals: | | 75.00 | 37.50 | 75.00 | 37.50 | 75.00 | |
| 66.67% water: | | 150.02 | 75.01 | 150.02 | 75.01 | 150.02 | |
| Boroncitrates: | | 225.02 | 112.51 | 225.02 | 112.51 | 225.02 | |
| Additional mixing water added: | | 67.80 | | 67.80 | | 67.80 | |
| Total water used: | | 217.82 | | 217.82 | | 217.82 | |
| Final Sets: | | 3 hrs | | 1 hr | | 21 min | |
| Compressive Strengths (psi): | 1 da | 6750 | 1 day | 6350 | 1 day | 8500 | |
| "da" represents days | 7 day | 8000 | 7 day | 8800 | 7 day | 11000 | |
| | 14 day | 10000 | 14 day | 11950 | 14 day | 11125 | |
| Mix Design: | | 900 g St. Marys, KS Subbituminous Class C fly ash | | | Mixed 19 sec. | | |
| | | 90 g Type 1 portland cement | | 0.22 water/cement ratio | | | |
| | | 1485 g 30/70/fine sand | | 40/60% cement to sand mortar | | | |

The above three tests were mixed nineteen (19) seconds each to similate the very short mixing time used when mixing in a Volumetric or Mobile mixer.

EXAMPLE 10

Lithium Carbonate/Borax/Citric Acid
BORONCITRATE [SET] Control

| Chemicals | % Long Set | 100% Long Set | 60% Long Set | Combined 60% Long 40% Short Set | 40% Short Set | 100% Short Set | % Short Set |
|---|---|---|---|---|---|---|---|
| Borax | 0.2500 | 18.36 | 11.02 | 14.69 | 3.67 | 9.18 | 0.1250 |
| Lithium Carbonate | 0.2400 | 17.63 | 10.58 | 19.57 | 8.99 | 22.48 | 0.3061 |
| Citric Acid | 0.5100 | 37.46 | 22.48 | 39.19 | 16.72 | 41.79 | 0.5690 |
| 25% Chemicals: | | 73.45 | 44.07 | 73.45 | 29.38 | 73.45 | |
| 75% Water: | | 220.35 | 132.22 | 220.35 | 88.14 | 220.35 | |
| Boroncitrates: | | 293.80 | 176.29 | 293.80 | 117.52 | 293.80 | |
| Additional mixing water added: | | 7.35 | | 7.35 | | 7.35 | |
| Total water used: | | 227.70 | | 227.70 | | 227.70 | |
| Final Sets: | | 3 hr 28 min | | 50 min | | 8 min | |
| Compressive Strength: | 1 day | 5200 | 1 hr 30 min | 2500 | 21 hrs | 6250 | |
| (psi): | 7 day | 7750 | 7 day | 9000 | 7 day | 10000 | |
| | 14 day | 11250 | 14 day | 11500 | 14 day | 12000 | |
| Mix Design: | | 900 g St. Marys, KS Subbituminous Class C fly ash | | | Mixed 3 min. | | |
| | | 90 g Type 5 portland cement | | 0.23 water/cement ratio | | | |
| | | 1485 g 30/70/fine sand | | 40/60% cement to sand mortar | | | |

EXAMPLE 11

| | | | | Combined | | | |
|---|---|---|---|---|---|---|---|
| Chemicals | % Long Set | 100% Long Set | 50% Long Set | 50% Long 50% short Set | 50% Short Set | 100% Short Set | % Short Set |
| Lithium Carbonate/Boric Acid/Borax/Citric Acid BORONCITRATE [SET] Control | | | | | | | |
| Boric Acid | 0.1127 | 8.88 | 4.44 | 5.33 | 0.89 | 1.78 | 0.0226 |
| Borax | 0.2588 | 20.38 | 10.19 | 12.23 | 2.04 | 4.08 | 0.0518 |
| Lithium Carbonate | 0.2240 | 17.64 | 8.82 | 21.32 | 12.50 | 25.00 | 0.3174 |
| Citric Acid | 0.4045 | 31.86 | 15.93 | 39.88 | 23.95 | 47.90 | 0.6082 |
| 30% Chemicals | | 78.76 | 39.38 | 78.76 | 39.38 | 78.76 | |
| 70% Water | | 183.76 | 91.88 | 183.76 | 91.88 | 183.76 | |
| Boroncitrates: | | 262.52 | 131.26 | 262.52 | 131.26 | 262.52 | |
| Additional mixing water added: | | 43.94 | | 43.94 | | 43.94 | |
| Total water used: | | 227.70 | | 227.70 | | 227.70 | |
| Final Sets: | | 24 hrs | | 7 hr 28 min | | 15 min | |
| Compressive Strengths (psi): | | n.t. | 19 hrs | 4100 | 1 day | 6400 | |
| "d" represents days | 7 day | 6000 | 7 day | 7600 | 7 day | 8400 | |
| "n.t." not taken | 14 day | 9800 | 14 day | 9800 | 14 day | 10000 | |
| Mix Design: | 900 g Pueblo, CO Subbituminous Class C Fly Ash   mixed 3 min. | | | | | | |
| | 90 g Type 1 portland cement   0.23 water/cement ratio | | | | | | |
| | 1485 g 30/70/fine sand   40/60% cement to sand mortar | | | | | | |

Contrary to what some believe, the strengths do not increase if the cementitious materials set slow. As all the examples show, when allowed to set faster the strengths over the same time period following set are usually higher. The strengths of the retarded mixes do tend to catch up to the faster setting materials following months of curing.

There are few applications requiring 24 hour set times. However, these same Boroncitrates used with faster setting cementitious materials would set faster. Either way the Long Set and Short Set Boroncitrates can be adjusted to fit the desired need.

EXAMPLE 12

| | | | Long (L) and Short (S) Sets Combined | | | | |
|---|---|---|---|---|---|---|---|
| Chemicals | % Long Set | 100% Long Set | 80% (L) 20% (S) Set | 40% (L) 60% (S) Set | 20% (L) 80% (S) Set | 100% Short Set | % Short Set |
| Lithium Hydroxide/Boric Acid/Citric Acid BORONCITRATE [SET] Control | | | | | | | |
| Boric Acid | 0.2400 | 18.00 | 15.45 | 10.34 | 7.79 | 5.24 | 0.0699 |
| Lithium Hydroxide | 0.3000 | 22.50 | 23.43 | 25.28 | 26.20 | 27.13 | 0.3617 |
| Citric Acid | 0.4600 | 34.50 | 36.13 | 39.38 | 41.00 | 42.63 | 0.5684 |
| 50% Chemicals | | 75.00 | 75.00 | 75.00 | 75.00 | 75.00 | |
| 50% Water | | 75.00 | 75.00 | 75.00 | 75.00 | 75.00 | |
| Boroncitrates: | | 150.00 | 150.00 | 150.00 | 150.00 | 150.00 | |
| Additional mixing water added: | | 155.00 | 155.00 | 155.00 | 155.00 | 155.00 | |
| Total water used: | | 230.00 | 230.00 | 230.00 | 230.00 | 230.00 | |
| Final Sets: | | 4 hrs. | 2 hr 21 mi | 29 min | 14 min | 7 min | |
| Compressive strength(psi): | | 1 d 4500 | 1 d 5000 | 1 d 5625 | 1 d 6625 | 1 d 7000 | |
| "d" represents days | | 7 d 7625 | 7 d 8375 | 7 d 8375 | 7 d 9500 | 7 d 10000 | |
| | | 14 d 9800 | 14 d 9750 | 14 d 9800 | 14 d 9525 | 14 d 11125 | |

-continued

| | Lithium Hydroxide/Boric Acid/Citric Acid BORONCITRATE [SET] Control | | | | | | |
|---|---|---|---|---|---|---|---|
| | | | Long (L) and Short (S) Sets Combined | | | | |
| Chemicals | % Long Set | 100% Long Set | 80% (L) 20% (S) Set | 40% (L) 60% (S) Set | 20% (L) 80% (S) Set | 100% Short Set | % Short Set |
| Mix Design: | 700 g Pueblo, Co Subbituminous Class C Fly Ash    mixed 3 min. 300 g Type 1 portland cement    0.23 water/cement ratio 1500 g 30/70/Fine Sand    40/60% cement to sand mortar | | | | | | |

EXAMPLE 13

| | Lithium Hydroxide/Borax/Citric Acid BORONCITRATE [SET] CONTROL | | | | | | |
|---|---|---|---|---|---|---|---|
| | | | | Combined | | | |
| Chemicals | % Long Set | 100% Long Set | 38% Long Set | 38% Long 62% Short Set | 62% Short Set | 100% Short Set | % Short Set |
| Borax | 0.3117 | 25.00 | 9.50 | 15.70 | 6.20 | 10.00 | 0.1247 |
| Lithium Hydroxide | 0.2369 | 19.00 | 7.22 | 20.03 | 12.81 | 20.66 | 0.2576 |
| Citric Acid | 0.4514 | 36.20 | 13.76 | 44.47 | 30.71 | 49.54 | 0.6177 |
| 33.33% Chemicals | | 80.20 | 30.48 | 80.20 | 49.72 | 80.20 | |
| 66.67% Water | | 160.42 | 60.96 | 160.42 | 99.46 | 160.42 | |
| Boroncitrates: | | 240.62 | 91.44 | 240.62 | 149.18 | 240.62 | |
| Additional mixing water added: | | 0.00 | | 0.00 | | 0.00 | |
| Total water used: | | 160.42 | | 160.42 | | 160.42 | |
| Final Sets: | | 4 hrs 30 min | | 42 min | | 17 min | |
| Compressive Strengths (psi) | 1 day | 4250 | 1 day | 6250 | 1 day | 7875 | |
| | 7 day | 6250 | 7 day | 8750 | 7 day | 10313 | |
| | 14 day | 7500 | 14 day | 10000 | 14 day | 13375 | |
| Mix Design | 900 g Waukegan, IL Subbituminous Class C Fly Ash mixed 3 min. 90 g Type 3 portland Cement    0.162 water/cement ratio 1485 g 30/70/Fine sand    40/60% cement to sand mortar | | | | | | |

In this example, we have demonstrated that all of the mixing water needed for a particular mix design can be included in the Boroncitrate so that no water is added just prior to placement.

EXAMPLE 14

| | Lithium Hydroxide/Boric Acid/Borax/Citric Acid BORONCITRATE [SET] Control | | | | | | |
|---|---|---|---|---|---|---|---|
| | | | | Combined | | | |
| Chemicals | % Long Set | 100% Long Set | 16% Long Set | 16% Long 84% Short Set | 84% Short Set | 100% Short Set | 72 % Short Set |
| Boric Acid | 0.0818 | 5.70 | 0.91 | 2.26 | 1.34 | 1.60 | 0.0230 |
| Borax | 0.1909 | 13.30 | 2.13 | 5.32 | 3.19 | 3.80 | 0.0545 |

-continued

Lithium Hydroxide/Boric Acid/Borax/Citric Acid
BORONCITRATE [SET] Control

| Chemicals | % Long Set | 100% Long Set | 16% Long Set | Combined 16% Long 84% Short Set | 84% Short Set | 100% Short Set | 72% Short Set |
|---|---|---|---|---|---|---|---|
| Potassium Hydroxide | 0.2727 | 19.00 | 3.04 | 18.92 | 15.88 | 18.90 | 0.2713 |
| Citric Acid | 0.4546 | 31.67 | 5.07 | 43.18 | 38.11 | 45.37 | 0.6512 |
| 50% Chemicals | | 69.67 | 11.15 | 69.67 | 58.52 | 69.67 | |
| 50% Water | | 69.67 | 11.15 | 69.67 | 58.52 | 69.67 | |
| Boroncitrates: | | 139.34 | 22.30 | 139.34 | 117.04 | 139.34 | |
| Additional mixing water added: | | 158.03 | | 158.03 | | 158.03 | |
| Total water used: | | 227.70 | | 227.70 | | 227.70 | |
| Final Sets: | | 6 hr 30 min | | 47 min | | 16 min | |
| Compressive strength(psi): | | 1 day 6750 | | 1 day 7500 | | 1 day 8750 | |
| | | 7 day 11000 | | 7 day 10500 | | 7 day 11000 | |
| | | 14 day 12500 | | 14 day 13250 | | 14 day 13000 | |
| Mix Design | 900 g Oklaunion, TX Subbituminous Class C fly a mixed 3 min. | | | | | | |
| | 90 g Type 1 portland cement  0.23 water/cement ratio | | | | | | |
| | 1485 g 30/70/Fine sand  40/60% cement to sand mortar | | | | | | |

EXAMPLE 15

The following example shows Boroncitrates made from manufacture's combined chemicals (e.g., Lithium Citrate and Polyborates). For example polyborates are a manufacturer's combination of boric acid and borax and lithium citrate is a combination of lithium carbonate OR lithium hydroxide AND citric acid. In prior examples we did not use manufactured citrates to create boroncitrates, but instead used the individual components. In this example we have shown that the use of manufactured citrates to create boroncitrates can provide similar results. However, the boric acid and borax would still have to be put into solution as described in this invention.

Lithium Citrate/
Polyborate
Boroncitrate [SET]
Control

| Chemicals | Percent | 100% Long Set | Percent | 100% Short Set |
|---|---|---|---|---|
| Polyborates | 0.2230 | 17.56 | 0.0744 | 5.86 |
| Lithium Citrate is | 0.7770 | 61.20 | 0.9256 | 72.90 |
| a manufacturer's | | | | |
| 45% Chemicals | | 78.76 | | 78.76 |
| 55% Water: | | 96.26 | | 96.26 |
| Boroncitrates: | | 175.02 | | 175.02 |
| Additional mixing water added: | | 131.44 | | 131.44 |
| Total water used: | | 227.70 | | 227.70 |
| Final Sets: | | 6 hr | | 10 min |
| Compressive strength (psi) | 1 day | 8000 | 1 day | 9750 |
| | | Ph 10 | | Ph 10 |
| Mix Design: | 900 g | Pueblo, CO Subbituminous Class C Fly Ash | Mixed 3 minutes | |
| | 90 g | Type 1 portland cement | 0.23 water/cement ratio | |

-continued

Lithium Citrate/
Polyborate
Boroncitrate [SET]
Control

| Chemicals | | Percent | 100% Long Set | Percent | 100% Short Set |
|---|---|---|---|---|---|
| | 1485 | 30/70/Fine Sand | | 40/60 Cement to Sand Ratio | |
| *Amount of Boric Acid in Polyborate | | | | | [0.2987] |
| *Amount of Borax in Polyborate | | | | | [0.7013] |
| **Amount of Lithium Carbonate in Citrate if Ph7 | | | | | [0.3846] |
| **Amount of Citric Acid in Citrate if Ph7 | | | | | [0.6154] |
| or | | | | | or |
| **Amount of Lithium Hydroxide in Citrate if Ph7 | | | | | [0.4530] |
| **Amount of Citric Acid in Citrate if Ph7 | | | | | [0.5470] |

The amounts shown in brackets [ ] are shown are actual percentages of the boric acid or borax used in polyborates and the percentages of sodium hydroxide, sodium carbonate and citric acid used in sodium citrates with a PH of 7. However, the PH of the sodium citrate used in this example was PH10.

Manufactured citrates cause a problem because the manufacturer do not divulge whether they are using carbonates or hydroxides with citric acid to make the citrates. For purposes of clarification, the percentage of both the carbonates and the citric acid are shown as well as the percentage of the hydroxide and citric acid.

This shows that the manufacturer of the citrate used/elected to make the particular citrate with a slightly greater alkali content. This presents a problem because it is the citric acid that accelerates the set time and the borons that retard the set. If the manufactured citrate that is used contains more citric acid, it would necessitate using more borons to get the same set time.

While the above shows boroncitrates can be made in this way, the person making the combination of chemicals must still check the Ph of the combined chemicals. In this instance the Polyborate with a Ph of 8 combined with a Potassium Citrate with a Ph of 10 resulted in the Long set having a Ph of 11 and the short set a Ph of 12. The Ph would need to be adjusted accordingly to allow for safe handling. To bring the Ph within an acceptable range between 6 and 10, the person making the boroncitrate would have to adjust the Ph with an acid, (most likely citric acid). This of course defeats the purpose of using a manufacture's prepared citrate. It is most important to note that the Ph has nothing to do with causing the set to be fast or slow. The time of set is regulated by the percentage of the various chemicals used.

One of the problems with using a manufacturer's combined lithium citrate presents itself if you are attempting to provide boroncitrates that are resistant to Alkali Silca Reaction ("ASR") in the aggregates. As indicated in prior art by this inventor, lithium can be used to prevent ASR if used in a sufficient quantity. Because you would not know the amount of lithium in the manufacturer's combined lithium citrate, you would have no way of knowing if your boroncitrate had enough lithium.

EXAMPLE 16

Sodium Hydroxide/Boric Acid/Citric Acid
BORONCITRATE [SET] Controls

| Chemicals | % Long Set | 100% Long Set | 76% Long Set | Combined 76% Long 24% Short Set | 24% Short Set | 100% Short Set | % Short Set |
|---|---|---|---|---|---|---|---|
| Boric Acid | 0.3851 | 24.00 | 18.24 | 19.18 | 0.94 | 3.91 | 0.0627 |
| Sodium Hydroxide | 0.2460 | 15.33 | 11.65 | 17.06 | 5.41 | 22.55 | 0.3618 |
| Citric Acid | 0.3689 | 22.99 | 17.47 | 26.08 | 8.61 | 35.86 | 0.5754 |
| 45% Chemicals | | 62.32 | 47.36 | 62.32 | 14.96 | 62.32 | |
| 55% Water | | 76.17 | 57.89 | 76.17 | 18.28 | 76.17 | |
| Boroncitrates: | | 138.49 | 105.25 | 138.49 | 33.24 | 138.49 | |
| Additional mixing water added: | | 151.53 | | 151.53 | | 151.53 | |
| Total water used: | | 227.70 | | 227.70 | | 227.70 | |
| Final Sets: | | 24 hrs | | 1 hr 17 min | | 10 min | |
| Compressive | 1 day | 4000 | 1 day | 5000 | 1 day | 5250 | |
| Strengths (psi) | 7 day | 5000 | 7 day | 7350 | 7 day | 7250 | |
| | 14 day | 5625 | 14 day | 8500 | 14 day | 8000 | |
| Mix Design | 900 g Waukegan, IL Subbituminous Class C fly ash     mixed 3 mins | | | | | | |
| | 90 g Type 3 portland Cement     0.23 water/cement ratio | | | | | | |
| | 1485 g 30/70/Fine sand     40/60% cement to sand mortar | | | | | | |

EXAMPLE 17

Sodium Hydroxide/Borax/Citric Acid
BORONCITRATE [SET] CONTROL

| Chemicals | % Long Set | 100% Long Set | 50% Long Set | Combined 50% Long 50% Short Set | 50% Short Set | 100% Short Set | % Short Set |
|---|---|---|---|---|---|---|---|
| Borax | 0.3440 | 25.80 | 12.90 | 17.20 | 4.30 | 8.60 | 0.1147 |
| Sodium Hydroxide | 0.2135 | 16.01 | 8.01 | 20.46 | 12.45 | 24.90 | 0.3320 |
| Citric Acid | 0.4425 | 33.19 | 16.60 | 37.35 | 20.75 | 41.50 | 0.5533 |
| 35% Chemicals | | 75.00 | 37.50 | 75.00 | 37.50 | 75.00 | |
| 65% Water | | 139.29 | 69.65 | 139.29 | 69.65 | 139.29 | |
| Boroncitrates: | | 214.29 | 107.15 | 214.29 | 107.15 | 214.29 | |
| Additional mixing water added: | | 88.41 | | 88.41 | | 88.41 | |
| Total water used: | | 227.70 | | 227.70 | | 227.70 | |
| Final Sets: | | 3 hrs | | 30 min | | 14 min | |
| Compressive | 1 day | 4800 | 1 hr | 2450 | 1 day | 7100 | |
| Strengths (psi) | 3 day | 8250 | 1 day | 5800 | 5 day | 9250 | |
| | 14 day | 9450 | 14 day | 9750 | 14 day | 11125 | |
| Mix Design: | 900 g Pueblo, CO Subbituminous Class C Fly Ash     mixed 3 mins. | | | | | | |
| | 90 g Type 5 portland cement     0.23 water/cement ratio | | | | | | |
| | 1485 g 30/70/Fine sand     40/60% cement to sand mortar | | | | | | |

EXAMPLE 18

| | Sodium Hydroxide/Boric Acid/Borax/Citric Acid Boroncitrate [SET] Control | | | | | | |
|---|---|---|---|---|---|---|---|
| | | | | Combined | | | |
| Chemicals | % Long Set | 100% Long Set | 60% Long Set | 60% Long 40% Short Set | 40% Short Set | 100% Short Set | % Short Set |
| Boric Acid | 0.0963 | 6.55 | 3.93 | 4.45 | 0.52 | 1.31 | 0.0193 |
| Borax | 0.1721 | 11.70 | 7.02 | 7.96 | 0.94 | 2.34 | 0.0344 |
| Sodium Hydroxide | 0.2650 | 18.02 | 10.81 | 20.77 | 9.96 | 24.89 | 0.3660 |
| Citric Acid | 0.4666 | 31.73 | 19.04 | 34.82 | 15.78 | 39.46 | 0.5803 |
| 35% Chemicals: | | 68.00 | 40.80 | 68.00 | 27.20 | 68.00 | |
| 65% Water: | | 126.29 | 75.77 | 126.29 | 50.52 | 126.29 | |
| Boroncitrates: | | 194.29 | 116.57 | 194.29 | 77.72 | 194.29 | |
| Additional mixing water added: | | 101.41 | | 101.41 | | 101.41 | |
| Total water used: | | 227.70 | | 227.70 | | 227.70 | |
| Final Sets: | | 3 hrs | | 31 min | | 7 min | |
| Compressive strength (psi) | 3 day | 6250 | 3 day | 8250 | 3 day | 9000 | |
| | 7 day | 8400 | 7 day | 8800 | 7 day | 9750 | |
| | 14 day | 9000 | 14 day | 10750 | 14 day | 11750 | |
| Mix Design: | 900 g Pueblo, CO Subbituminous Class C fly ash    mixed 3 min. | | | | | | |
| | 90 g Type 2 portland cement    0.23 water/cement ratio | | | | | | |
| | 1485 g 30/70/Fine sand    40/60% cement to sand mortar | | | | | | |

Seven minute set time would be ideal for Shot-Crete or Gunite operations, whereas thirty one minutes would be about right for a small pot hole, but larger pavement repairs might need three hours of set time. We should be able to repair interstate highways in a fraction of the time because Boroncitrates will allow the trucks to move down the highway intermittently making what ever size repairs are necessary. The added safety for the motorist who must dodge orange cones can be greatly improved. Safety for the workers will be improved because they will not be diverting traffic around concrete repairs that now takes hours to take set, and days to gain strength.

EXAMPLE 19

| | Sodium Carbonate/Boric Acid/Citric Acid BORONCITRATE [SET] Controls | | | | | | |
|---|---|---|---|---|---|---|---|
| | | | | Combined | | | |
| Chemicals | % Long Set | 100% Long Set | 20% Long Set | 20% Long 80% Short Set | 80% Short Set | 100% Short Set | % Short Set |
| Boric Acid | 0.3000 | 21.00 | 4.20 | 7.64 | 3.44 | 4.30 | 0.0614 |
| Sodium Carbonate | 0.3254 | 22.78 | 4.56 | 30.58 | 26.02 | 32.53 | 0.4647 |
| Citric Acid | 0.3746 | 26.22 | 5.24 | 31.78 | 26.54 | 33.17 | 0.4739 |
| 35% Chemicals: | | 70.00 | 14.00 | 70.00 | 56.00 | 70.00 | |
| 65% Water | | 130.00 | 26.00 | 130.00 | 104.00 | 130.00 | |
| Boroncitrates: | | 200.00 | 40.00 | 200.00 | 160.00 | 200.00 | |
| Additional mixing water added: | | 97.70 | | 97.70 | | 97.70 | |
| Total water used: | | 227.70 | | 227.70 | | 227.70 | |
| Final Sets: | | 13 hr 30 min | | 1 hr 27 min | | 9 min | |
| Compressive Strengths (psi) | 1 day | 4600 | 1 day | 5200 | 1 day | 6000 | |
| | 7 day | 5625 | 7 day | 7500 | 7 day | 8400 | |
| | 10 day | 6000 | 14 day | 8250 | 14 day | 9750 | |
| Mix Design | 900 g Pueblo, CO Subbituminous Class C fly ash    mixed 3 mins | | | | | | |
| | 90 g Type 2 portland cement    0.23 water/cement ratio | | | | | | |
| | 1485 g 30/70/Fine sand    40/60% cement to sand mortar | | | | | | |

An unexpected benefit occurs when using Boroncitrates. As the set time is reduced the percent of the alkali metals and citric acid increases and the percent of the borons are reduced. Increasing the alkali metals and citric acid increases the flow ability without increasing the amount of water being used. This is very important when making small repairs which do not require as much effort and where speed is critical. The reverse is true when making large placements which normally require time to trowel and otherwise work the material. As the set time is increased the percent of alkali metals and citric acid are reduced while the borons which retard the mix are increased. This has the effect of making the material firmer which is exactly what is needed to place the material properly.

The examples we have shown, show the same amount of water being used for any of the set times desired. However, as additional water is normally added to establish the slump desired on the job, then the amount of total water used with Boroncitrates still remains the option of the operator regardless of what set time is selected

EXAMPLE 20

| Chemicals | % Long Set | 100% Long Set | 10% Long Set | Combined 10% Long 90% Short Set | 90% Short Set | 100% Short Set | % Short Set |
|---|---|---|---|---|---|---|---|
| Borax | 0.3300 | 23.10 | 2.31 | 9.59 | 7.28 | 8.09 | 0.1156 |
| Sodium Carbonate | 0.2691 | 18.84 | 1.88 | 26.36 | 24.48 | 27.20 | 0.3886 |
| Citric Acid | 0.4009 | 28.06 | 2.81 | 34.05 | 31.24 | 34.71 | 0.4959 |
| 35% Chemicals | | 70.00 | 7.00 | 70.00 | 63.00 | 70.00 | |
| 65% Water | | 130.00 | 13.00 | 130.00 | 117.00 | 130.00 | |
| Boroncitrates: | | 200.00 | 20.00 | 200.00 | 180.00 | 200.00 | |
| Additional mixing water added: | | 97.70 | | 97.70 | | 97.70 | |
| Total water used: | | 227.70 | | 227.70 | | 227.70 | |
| Final Sets: | | 4 hrs 5 min | | 48 min | | 30 min | |
| Compressive | 1 day | 4500 | 1 hr | 5250 | 1 day | 5750 | |
| Strengths (psi) | 3 day | 5750 | 1 day | 6400 | 5 day | 6875 | |
| | 14 day | 8250 | 14 day | 9000 | 14 day | 9400 | |
| Mix Design: | | 900 g Pueblo, CO Subbituminous Class C Fly Ash mixed 3 mins. | | | | | |
| | | 90 g Type 5 portland cement    0.23 water/cement ratio | | | | | |
| | | 1485 g 30/70/Fine sand    40/60% cement to sand mortar | | | | | |

Table: Sodium Carbonate/Borax/Citric Acid BORONCITRATE [SET] Control

The examples of Boroncitrates shown above are to demonstrate how very precise the operator can adjust the time of set. Many conditions change the set time of cementitious materials long after the trucks delivering the material have left their plants to go to the job sites. Boroncitrates give the crews placing the material the ability to speed up or slow down the set as the ever changing conditions dictate.

EXAMPLE 21

| Chemicals | % Long Set | 100% Long Set | 66.5% Long Set | Combined Long (L) and Short (S) 66.5% (L) 33.5% (S) Set | 33.5% Short Set | 100% Short Set | % Short Set |
|---|---|---|---|---|---|---|---|
| Boric Acid | 0.0547 | 2.70 | 1.80 | 2.42 | 0.62 | 1.85 | 0.0375 |
| Borax | 0.1276 | 6.30 | 4.19 | 5.63 | 1.44 | 4.31 | 0.0873 |
| Sodium Carbonate | 0.3755 | 18.54 | 12.33 | 18.94 | 6.61 | 19.74 | 0.3998 |
| Citric Acid | 0.4423 | 21.84 | 14.52 | 22.39 | 7.87 | 23.48 | 0.4755 |
| 35% Chemicals: | | 49.38 | 32.84 | 49.38 | 16.54 | 49.38 | |
| 65% Water: | | 91.71 | 60.99 | 91.71 | 30.72 | 91.71 | |

Table: Sodium Carbonate/Boric Acid/Borax/Citric Acid BORONCITRATE [SET] Control

-continued

| Sodium Carbonate/Boric Acid/Borax/Citric Acid BORONCITRATE [SET] Control | | | | | | | |
|---|---|---|---|---|---|---|---|
| Chemicals | % Long Set | 100% Long Set | 66.5% Long Set | Combined Long (L) and Short (S) 66.5% (L) 33.5% (S) Set | 33.5% Short Set | 100% Short Set | % Short Set |
| Boroncitrates: | | 141.09 | 93.83 | 141.09 | 47.26 | 141.09 | |
| Additional mixing water added | | 135.99 | | 135.99 | | 135.99 | |
| Total water used: | | 227.70 | | 227.70 | | 227.70 | |
| Final Sets: | | 5 hrs | | 2 hr 45 min | | 1 hr 10 min | |
| Compressive strength (psi) | 1 day | 4250 | 1 day | 5400 | 1 day | 5250 | |
| | 2 day | 6225 | 3 day | 9250 | 3 day | 6250 | |
| | 14 day | 10950 | 14 day | 10000 | 14 day | 11000 | |
| Mix Design: | 900 g Pueblo, CO Subbituminous Class C fly ash   mixed 3 min. 90 g Type 2 portland cement   0.23 water/cement ratio 1485 g 30/70/Fine sand   40/60% cement to sand mortar | | | | | | |

These examples are provided to demonstrate that the type of metering system for the Boroncitrates on the equipment delivering the concrete or mortar could be quite precise.

Concrete has always had the disadvantage of taking hours to take set and days to gain strength. This is because the cements are made to set slow so that large placements can be made without the material beginning to take set prematurely. In recent years numerous patching materials have been developed that take set in and gain strengths rapidly. However, neither of these options provide the persons placing the concrete or mortars with what is truly needed, the ability to obtain faster or slower set times that is not established by the manufacturer, but instead is provided in response to the customer's need at the time of placement.

EXAMPLE 22

The following example shows boroncitrates made from manufacture's combined chemicals, (e.g., sodium citrate and polyborate). For example Polyborates are a manufacturer's combination of boric acid and borax and sodium citrate is a combination of sodium carbonate OR sodium hydroxide AND citric acid. In prior examples we did not use manufactured citrates to create boroncitrates, but instead used the individual components. In this example we have shown that the use of manufactured citrates to create boroncitrates can provide similar results. However, the boric acid and borax would still have to be put into solution as described in this invention.

| Sodium Citrate/Polyborate Boroncitrate (SET) Control | | | | |
|---|---|---|---|---|
| Chemicals | Percent | 100% Short Set | Percent | Short Set |
| Amount of Polyborate* Used: | 0.1823 | 9.00 | 0.1247 | 6.16 |
| Amount of Sodium Citrate** Used: | 0.8177 | 40.38 | 0.8753 | 43.22 |
| 45% Chemicals | | 49.38 | | 49.38 |
| 55% Water: | | 60.35 | | 60.35 |
| Boroncitrates: | | 109.73 | | 109.73 |

-continued

| | | | | |
|---|---|---|---|---|
| Additional mixing water added: | | 167.35 | | 167.35 |
| Total water used: | | 227.70 | | 227.70 |
| Final Sets: | | 15 min | | 11 min |
| Compressive strength (psi) | 1 day | 5800 Ph 9 | 1 day | 5750 Ph 10 |
| Mix Design: | 900 g Pueblo, CO Subbituminous Class C Fly Ash   Mixed 3 minutes 90 g Type 1 portland cement 0.23 water/cement ratio 1485 30/70/Fine Sand   40/60 Cement to Sand Ratio | | | |
| *Amount of Boric Acid in Polyborate | | | | [0.2987] |
| *Amount of Borax in Polyborate | | | | [0.7013] |
| **Amount of Sodium Hydroxide in Citrate if PH7 | | | | [0.3846] |
| **Amount of Citric Acid in Citrate if PH7 or | | | | [0.6154] |
| **Amount of Sodium Carbonate in Citrate if PH7 | | | | [0.4530] |
| **Amount of Citric Acid in Citrate if PH7 | | | | [0.5470] |

The amounts shown in brackets [ ] are shown are actual percentages of the boric acid or borax used in polyborates and the percentages of sodium hydroxide, sodium carbonate and citric acid used in sodium citrates with a PH of 7. However, the PH of the sodium citrate used in this example was PH10.

Manufactured citrates cause a problem because the manufacturer do not divulge whether they are using carbonates or hydroxides with citric acid to make the citrates. As you can see by the examples, the percentage of both the carbonates and the citric acid are shown as well as the percentage of the hydroxide and citric acid for clarification.

This shows that the manufacturer of the citrate used, elected to make the particular citrate with a slightly greater alkali content. This presents a problem because it is the citric acid that accelerates the set time and the borons that retard the set. If the manufactured citrate that is used contains more citric acid, it would necessitate using more borons to get the same set time. The resulting PH of the boroncitrates were PH9 and PH10 respectively.

While the above shows boroncitrates can be made in this way, the person making the combination of chemicals must still check the PH of the combined chemicals to ensure safety in handling. In this instance the polyborate with a PH of 8 combined with the sodium citrate with a PH of 10 provided two boroncitrates within the safe range of 6 to 10.

CONCLUSION

Boroncitrate will minimize construction delays. Boroncitrate will provide more time for the more complex placements of concrete. Time that is now being wasted will be saved. Examples will show that the set time of the cementitious composition can be altered by simply turning a dial. Concrete construction will become easier and more cost efficient. A larger percent of waste materials will be productively used, and the reason for banning their use will be negated. Cementitious materials will be greatly improved as their cost is reduced. Corrosion protection, nuclear shielding, and the reduction of permeability will be enhanced, while alkali-silica-reaction can be eliminated to permit the use of what would otherwise be unusable, reactive aggregates.

What is claimed is:

1. A method for making a high performance hydraulic cement with adjustable set times comprising:
    combining an aqueous solution from about 50-75 wt-% water, from about 20-50 wt-% citrate accelerant together with from about 0.5-20 wt-% boron retarding agent;
    combining said aqueous solution with hydraulic cementitious material; and
    providing workplace adjustable set times that can be slowed down or accelerated prior to or during placement by adjusting the ratio of said citrate accelerant and boron retarding agent while maintaining a constant total volume of said cementitious material.

2. The method according to claim 1 wherein said citrate accelerant is a member selected from the group consisting of lithium hydroxide, lithium carbonate, sodium hydroxide, sodium carbonate, potassium hydroxide, potassium carbonate, rubidium hydroxide, rubidium carbonate, cesium hydroxide, cesium carbonate, francium hydroxide, francium carbonate, citric acid and mixtures thereof.

3. The method according to claim 1 wherein said boron retarding agent is a member selected from the group consisting of polyborates, boric acid, borax and mixtures thereof.

4. The method according to claim 1 wherein said citrate accelerant is a member selected from the group consisting of lithium citrate, sodium citrate, potassium citrate, rubidium citrate, cesium citrate, francium citrate and mixtures thereof.

5. The method according to claim 1 further comprising the steps of heating and agitating.

6. The method according to claim 5 wherein said heating and agitating occur while adding said boron retarding agent and wherein a temperature of about 180° F. is maintained during said agitating for about 20 minutes.

7. The method according to claim 5 wherein said heating and agitating occur while adding said boron retarding agent and a temperature in excess of 212° F. is maintained during said agitating.

8. The method according to claim 1 further comprising neutralizing the pH of said aqueous solution to between about 6 to 10.

9. The method according to claim 1 further comprising drying said aqueous solution to create a powder before adding to said cementitious material.

10. The method according to claim 1 wherein said aqueous solution comprises an increased ratio of said boron retarding agent to said citrate accelerant and is mixed with said hydraulic cementitious material to achieve said high performance hydraulic cement material with a longer set time.

11. The method according to claim 1 wherein said aqueous solution comprises an increased ratio of said citrate accelerant to said boron retarding agent and is mixed with said hydraulic cementitious material to make said high performance hydraulic cement material with a shorter set time.

12. The method according to claim 10 or 11 wherein various ratios of said aqueous solutions are combined such that said aqueous solution according to claim 10 is combined with said aqueous solution according to claim 11 while maintaining the same total quantity of said aqueous solution, thereby achieving a complete range of workplace adjustable set times for said hydraulic cement material with set times shorter than according to claim 10 and set times longer than according to claim 11.

13. The method according to any one of claims 10-11 wherein the total volume of said aqueous solutions remains constant, whereby decreasing the quantity of said citrate accelerant correspondingly increases the quantity of said boron retarding agent or whereby increasing the quantity of said citrate accelerant correspondingly decreases the quantity of said boron retarding agent thereby maintaining the same relative slump.

14. The method according to claim 10 wherein a slump of said hydraulic cementitious material is reduced when a higher ratio of said boron retarding agent to said citrate accelerant is concomitantly mixed with said cementitious material to facilitate slower set time of said hydraulic cement material.

15. The method according to claim 11 wherein a slump of said hydraulic cement material is increased when a higher ratio of said citrate accelerant to said boron retarding agent is concomitantly mixed with said cementitious material to facilitate pouring said hydraulic cement material with a faster set time.

16. The method according to claim 3 wherein increasing a ratio of said borax while decreasing a ratio of said boric acid achieves said hydraulic cement material which is more fluid while in a plastic state.

17. The method according to claim 3 wherein increasing a ratio of said boric acid while decreasing a ratio of said borax achieves said cementitious material which is more thixotropic while in a plastic state.

18. The method according to claim 1 wherein said cementitious material remains unfrozen at temperatures as low as 10° F. while in a plastic state and sets while gaining usable strength at said temperatures.

19. The method according to claim 1 wherein larger quantities of said aqueous solution are used with said cementitious material than necessary to retard or accelerate the set or enhance the strength of said hydraulic cement material, whereby said larger quantities of aqueous solution provide increased corrosion protection for steel used with said hydraulic cement material to provide increased tensile and flexural strengths of hydraulic cement material-bound concrete or mortar.

20. The method according to claim 19 wherein said larger quantities of said aqueous solution additionally seals the pours of said hydraulic cement material-bound concrete, mortars and grouts thereby providing additional waterproofing protection.

21. The method according to claim 20 wherein said waterproofing protection of said hydraulic cementitious material-bound concrete, mortars and grouts are further protected from destruction caused by alkali silica reactive aggregates requiring excess water to react with said cementitious materials.

22. The method according to claim 20 wherein waterproofing is a dual mode of protection when said citrate accelerant is lithium citrate and further protects said hydraulic cementitious material-bound concrete, mortars and grouts containing alkali silica reactive aggregates.

23. The method according to claim 20 wherein said larger quantities of aqueous solution provides a plurality of neutron-absorbing boron compounds for nuclear shielding applications made with said hydraulic cementitious-material bound concrete, mortar, or grouts.

24. A high performance hydraulic cement with adjustable set times produced by the method of claim 1.

25. A high performance hydraulic cement with adjustable set times comprising:
   an aqueous solution from about 50-70% wt-% water, from about 20-50% citrate accelerant and from about 0.5-20% wt-% boron retarding agent; and
   a hydraulic cementitious material, wherein the ratio of said citrate accelerant to said boron retarding agent is increased to accelerate the setting time of said hydraulic cement or decreased to retard the setting time of said hydraulic cement while maintaining a constant volume of said cementitious material.

26. The composition of claim 25 wherein said citrate accelerant is a member selected from the group consisting of citric acid, potassium citrate, sodium citrate, lithium citrate and combinations of the same.

27. The composition of claim 25 wherein said boron retarding agent is a member selected from the group consisting of polyborates, boric acid, borax and mixtures thereof.

28. The composition of claim 25 wherein said aqueous solution is dried to create a powder to add to said hydraulic cementitious material.

29. The composition of claim 25 wherein said aqueous solution remains in solution at temperatures from about 10° F. to 140° F.

30. The composition of claim 25 wherein said alkali metal compound is a member selected from the group consisting of lithium hydroxide, lithium carbonate, sodium hydroxide, sodium carbonate, potassium hydroxide, potassium carbonate, rubidium hydroxide, rubidium carbonate, cesium hydroxide, cesium carbonate, francium hydroxide, francium carbonate and mixtures thereof.

31. The composition of claim 25 wherein the total volume of said aqueous solution remains constant regardless of change in said citrate accelerant to said boron retarding agent ratio, whereby decreasing the quantity of said citrate accelerant correspondingly increases the quantity of said boron retarding agent in said admixture or whereby increasing the quantity of said citrate accelerant correspondingly decreases the quantity of said boron retarding agent in said admixture and thereby maintains the same relative slump.

32. The composition of claim 25 wherein said hydraulic cementitious material is a member selected from the group consisting of Portland cement, fly ash and blended hydraulic cements.

* * * * *